Dec. 15, 1964  C. P. KELLEY  3,161,077
TIMER KNOB AND SHAFT FOR DOMESTIC APPLIANCE
Filed March 20, 1961  2 Sheets-Sheet 1
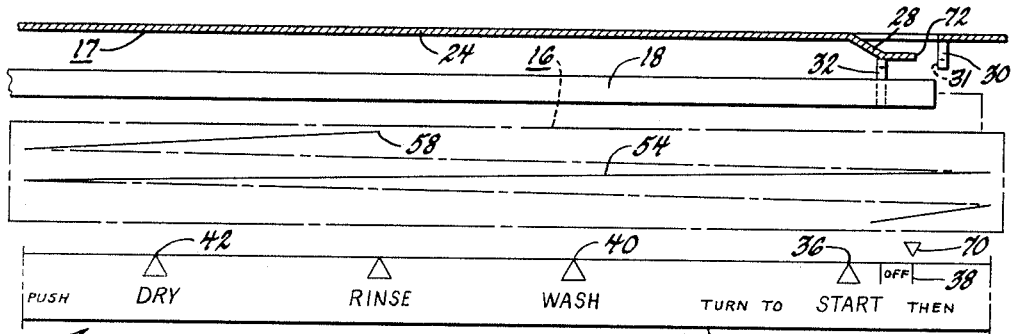
Fig. 3
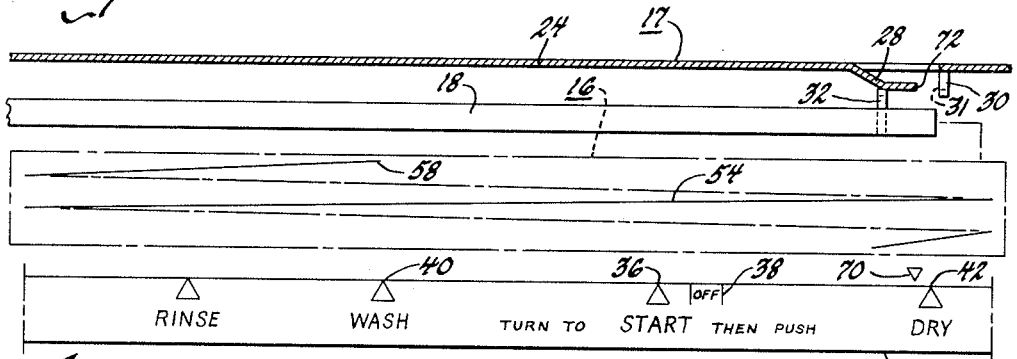
Fig. 4
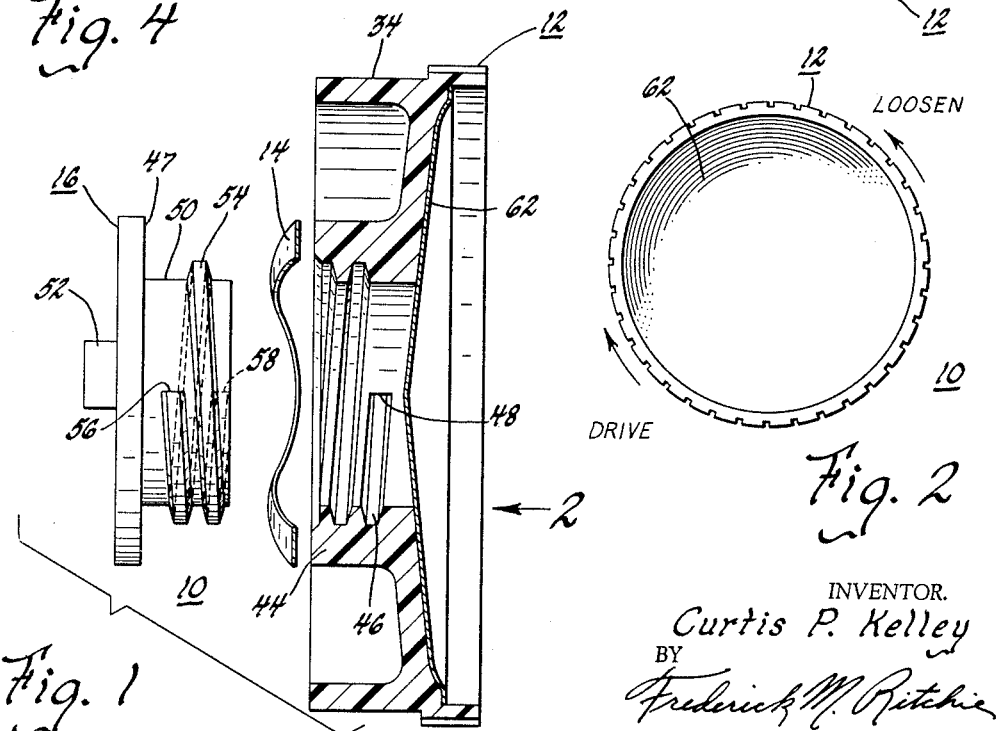
Fig. 1
Fig. 2
INVENTOR.
Curtis P. Kelley
BY
Frederick M. Ritchie
HIS ATTORNEY

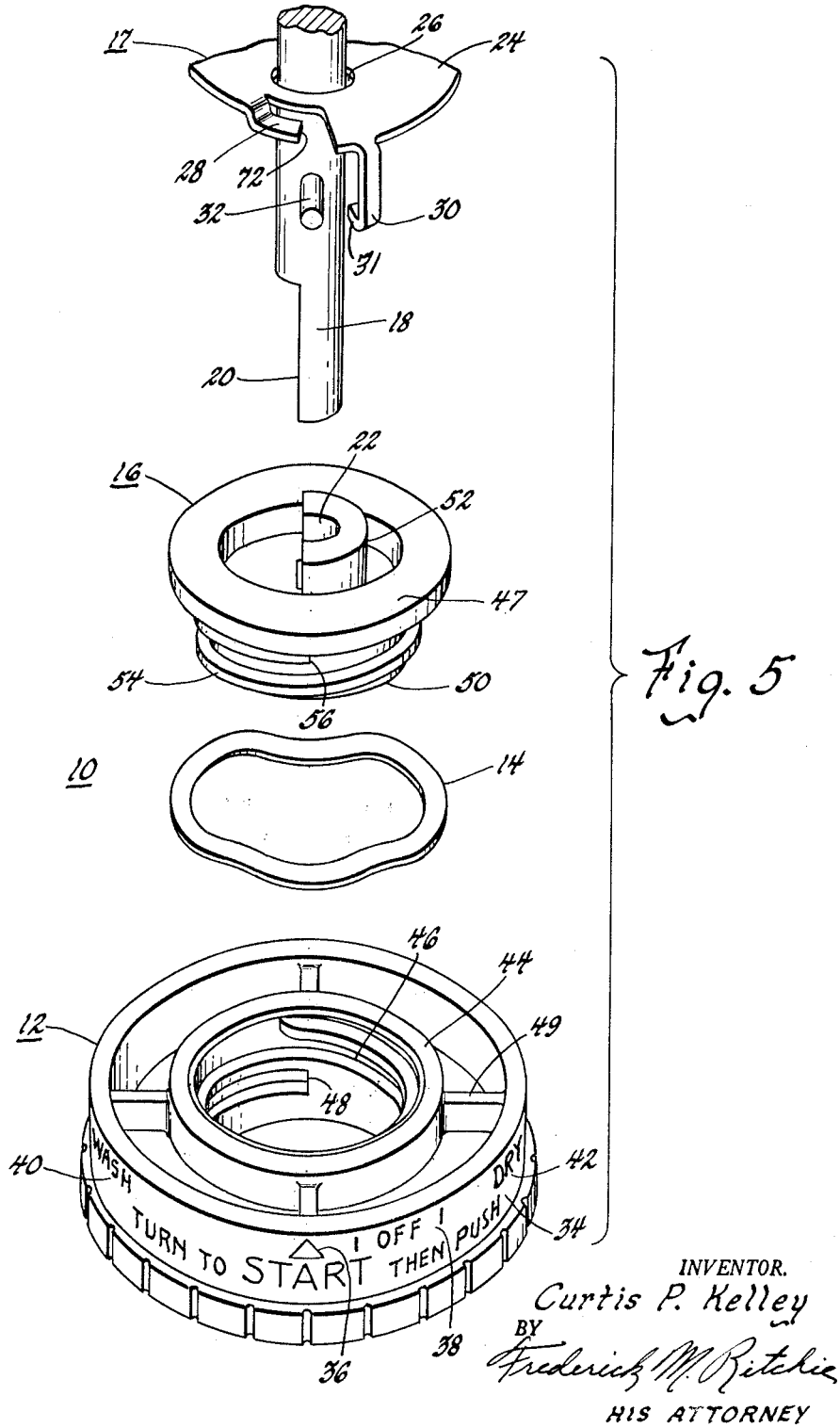

United States Patent Office 3,161,077
Patented Dec. 15, 1964

3,161,077
TIMER KNOB AND SHAFT FOR DOMESTIC APPLIANCE
Curtis P. Kelley, Dayton, Ohio, assignor to General Motors Corporation, Detroit, Mich., a corporation of Delaware
Filed Mar. 20, 1961, Ser. No. 96,813
2 Claims. (Cl. 74—553)

This invention relates to a domestic appliance and and more particularly to an improved timer knob.

Many timers in use in the appliance art today have rotatable timer shafts which rotate in one direction only. The cams and cam actuated switches for controlling the functioning of the appliance are thus designed to operate in response to the unidirectional rotation of the timer shaft. Since the cams and timer shaft are designed to operate in one direction only, occasional damage has resulted when the timer shaft is forcibly rotated in a reverse direction. Some prior art devices have sought to threadedly engage the timer dial with the timer shaft such that the dial will release or unscrew when rotated in the wrong direction. The problem with this prior art arrangement is that the dial indicia or markings representing the appliance cycle advance are frequently out of alignment or orientation with the actual function being initiated by the timer cams. Accordingly, it is an object of this invention to provide an improved timer knob which includes means for protecting the timer against incorrect timer shaft rotation as well as means for resetting or reorienting the timer dial with the timer cams when operated in the correct direction.

It is a general object of this invention to provide a timer knob which will prevent improper timer shaft rotation.

Another object of this invention is the provision of a timer dial having means for permitting relative rotation of the dial on a timer shaft, said means including means for positively and properly resetting the timer dial relative to the timer shaft when rotated in the correct direction.

Further objects and advantages of the present invention will be apparent from the following description, reference being had to the accompanying drawings wherein preferred embodiments of the present invention are clearly shown.

In the drawings:

FIGURE 1 is an exploded elevational view partly in section to show the improved timer knob of this invention;

FIGURE 2 is a top elevational view of the timer dial taken along the line 2 in FIGURE 1;

FIGURE 3 is a schematic 360° representation of a timer casing, a timer shaft, a timer dial hub and a timer dial unwrapped to illustrate a properly oriented condition of the components;

FIGURE 4 is a schematic 360° representation of the timer casing, timer shaft, timer dial hub and the timer dial unwrapped to illustrate an improperly oriented condition of the components; and FIGURE 5 is an exploded perspective view of the timer dial of this invention.

In accordance with this invention and with reference to FIGURE 5, an exploded perspective view of a timer dial is illustrated which is suitable for use with a timer for controlling dishwashers or other appliances. More particularly, the timer dial assembly 10 of this invention is comprised of a timer knob or dial 12, a knob spring 14 of the Belleville type and a timer knob hub 16. When the timer dial 10 is in assembled relationship, it is adapted for positioning on a timer shaft 18 which has a flattened or singe D terminal portion 20 which is received within a complementary socket 22 of the timer knob hub 16 so that the two elements rotate together.

The novel dial of this invention is adapted for use with a conventional timer shown fragmentarily at 17. The timer shaft 18 extending therefrom is also of a conventional type for moving a plurality of cams (not shown) which open and close a plurality of mating switch blades to control the appliance in accordance with the programmed operation. A synchronous timer motor and an escapement mechanism (not shown and also conventional) pulsatingly rotates the timer shaft 18 in a single direction to advance the cam actuated switches throughout a control cycle. The appliance timer is housed in an outer casing or wall 24 which includes an opening 26 into which the timer shaft 18 extends for fixed engagement with the various timer cams. In addition, the outer casing wall 24 of the timer includes a lanced out cam 28 and a stop 30. The elements 28 and 30 cooperate, as will be explained more fully hereinafter, with a transverse pin 32 affixed to and rotated with the timer shaft 18. Although the cam 28 and the stop pin 30 are shown externally on the timer casing wall 24, it should be understood that these elements may be anywhere within the timer mechanism so long as they are in position to cooperate with a protuberance such as 32 on the timer shaft 18.

The timer knob 12 is generally circular in configuration and includes a radially outer cylindrical portion or collar 34 on which the various indicia pertaining to the particular controlled cycle are stamped. For instance, in the case of a dishwasher cycle, the cycle may include a START position 36, an OFF position 38 as well as various operating positions such as a WASH position 40 and a DRY position 42. In addition to the marked collar or indicia portion of the timer knob, the knob includes a central cylindrical portion or socket 44 having an internal or recessed female thread 46 which has a blunt or squared-off inner terminal end 48. The timer knob 12 may be formed of plastic or other suitable moldable material and strengthened by ribs such as 49.

The timer knob hub 16 may also be formed of a plastic such as Delrin and includes a flange portion 47, a male threaded portion 50 and a timer shaft attachment portion 52. A raised thread 54 is formed on the threaded portion 50 and includes a blunt end 56 at the end of the thread next to the flange and a blunt or squared-off end 58 at the thread end remote from the flange (see FIGURE 1). It should be noted that the threads 50 and 46 are complementary so that the hub 16 and the knob 12 will screw together until the hub thread blunt end 58 meets the knob thread blunt end 48.

A Belleville type spring 14 may be positioned or sandwiched between the flange 47 of the timer knob hub 16 and the end of the inner cylinder 44 of the timer knob to provide frictional resistance in maintaining the two elements 16 and 12 in engagement.

A decorative circular trim plate 62 of chrome or suitable material is used to close the exposed outer end of the timer dial 12.

With reference now to FIGURES 2, 3 and 4, the operation of the novel timer knob of this invention will be set forth more clearly. As described hereinbefore, the timer shaft 18 is designed for unidirectional rotation. Any attempt to reverse the rotation of the timer shaft 18 will result in damage to the timer and more particularly the timer cams (not shown) which are designed to operate on the cam actuated switch blades in one direction only. This invention is designed to prevent the reverse rotation of the timer shaft 18. FIGURE 2 illustrates the driving or normal operating rotation of the timer dial 12 as in a clockwise direction. Conversely, a manual reverse rotation of the timer dial 12 in the counterclockwise direction is depicted to illustrate that motion which could damage the timer without the teachings of this invention.

To assemble the timer dial 10, the hub 16 is screwed into the central collar 44 of the timer knob 12 until the blunt end 58 of the timer hub thread abuts the blunt end 48 of the recessed thread in the timer knob. The Belleville spring 14 positioned between the flange 47 of the hub and the central collar of the knob will provide sufficient friction to impart a slight resistance to the relative rotation of the parts. The single D aperture 22 in the hub 16 is then inserted onto the extending flattened end 20 of the timer shaft 18 and the assembly is in proper position for operation.

In the normal sequential operation of the timer shaft 18, note that the affixed pin 32 will engage the cam surface 28 once in each 360° rotation of the timer shaft. Since the cam 28 is displaced axially from the timer wall 24, the timer shaft 18 will be moved axially outwardly or away from the timer wall 24 as the pin is cammed outwardly by the cam 28 in the last pulse of the timer cycle. In accordance with conventional practice, the axial shifting of the timer shaft 18 will open and close a main line switch to the timer motor, thereby energizing and deenergizing the timer control such as taught in the patent to Sisson 2,520,695 issued August 29, 1950. Although, the timer main line switch could be disposed in any fashion, this invention contemplates that the main line switch will be open and the timer motor deenergized when the timer shaft 18 is moved outwardly from the timer wall 24 or in a downward direction as viewed in FIGURE 5. On the other hand, when the timer shaft 18 is manually pushed in, the main line switch is closed and the timer motor energized for a cycle operation. It should be obvious that the shaft pin 32 must be angularly displaced from the flat of the cam 28 before the timer shaft 18 can be pushed inwardly. After the timer shaft 18 is axially moved outwardly by the cam to deenergize the timer, rotation of the shaft 18 is limited by the blocking engagement of the pin 32 with the bent over stop portion 31 of the stop member 30 on the timer casing wall 24.

Assuming now that a controlled appliance is idled with the deenergization of the timer, as schematically represented in FIGURE 3, the operation of this invention will be seen more clearly. Note that the indicia surrounding the START position 36 sets forth the instructions TURN TO START THEN PUSH. Following these instructions, the operator will grasp the outer periphery of the timer knob 12 and rotate the dial in a clockwise direction until the start indicator 36 on the knob aligns with an indicating mark 70 on the cabinet or any other fixed portion of the appliance to be controlled. By moving the start point 36 on the timer dial rightwardly, as viewed in FIGURE 3 schematically, the timer shaft pin 32 is moved beyond the end point 72 of the cam 28 and is thus in a position to permit the timer knob 12 to be pushed inwardly or upwardly, as viewed in FIGURE 3. This axial shift of the timer shaft will energize the timer motor by a main line switch (not shown). This then is the normal operation of the conventional timer dial 12 in which all parts of the timer dial assembly move as a unit. Occasionally, however, an operator attempts to turn the knob in an incorrect or counterclockwise direction and the advantages and operation of this invention are brought into play.

With reference to FIGURE 4, a counterclockwise or leftward movement of the timer knob 12 will displace the start indicator 36 leftwardly from the appliance indicator 70. Note that the timer shaft 18 will not be rotated therewith and will remain motionless to protect the inner cam mechanism of the timer. This is accomplished by the threaded relationship between the timer shaft fixed hub 16 and the timer knob 12. The counterclockwise rotation will cause the timer dial 12 to unscrew on the threads of the hub 16. Note, however, that such unscrewing will move the markings or indicia on the timer knob out of orientation with the relative cycle positioning of the timer shaft 18. If the timer knob were permitted to rotate during an appliance cycle in this misorientation, the user would be misinformed as to cycle advance. But by following the instructions, TURN TO START THEN PUSH, the novel timer knob and shaft of this invention are brought back into proper orientation before a cycle can be initiated.

Reorientation is accomplished in FIGURE 4 when the timer dial 12 is rotated in the proper clockwise or rightward direction. Due to the friction of the spring 14 in the sandwiched relation of hub and knob, clockwise rotation of the knob at first will cause the shaft 18 to move in a clockwise or rightward direction until the timer shaft pin 32 abuts the stop portion 31 stop 30 fixed relative to the timer wall 24. As soon as the pin and stop portion are engaged, the knob 12 will start rotating relatively to the timer knob hub 16. This relative rotation will continue until the blunt end 58 of the raised hub thread engages the blunt end 48 of the recessed thread 46 in the timer dial. At this point, knob movement will be terminated and the start indicator 36 will be in substantial alignment with the appliance indicator 70. Then the user, following the printed instructions, will PUSH the timer knob and the timer shaft 18 will be shifted axially inwardly or upwardly (FIGURE 4) to start the timer the pin 32 then being in an unlocked position to pass by the bent over stop portion 31 of the stop 30.

It should now be seen that an improved timer dial has been provided for an appliance which will prevent incorrect rotation of a timer shaft and which will automatically cause proper resetting and reorientation of the timer dial with the timer shaft before the timer shaft can be shifted to start the timer in accordance with the indicated instructions on the dial.

While the embodiments of the present invention as herein disclosed constitute preferred forms, it is to be understood that other forms might be adopted.

What is claimed is as follows:

1. In combination, a timer having a fixed cam a rotationally nonreversible, axially movable shaft power rotatable forwardly for controlling a timed cycle and adapted by the axially inward movement thereof to connect said timer for the supply of power thereto for initiating the rotation of said shaft and adapted by the axially outward movement thereof to disconnect said timer from the supply of power thereto for terminating the rotation of said shaft, a pin on said shaft engageable by said cam once in every 360° rotation thereof to move said shaft axially outwardly and a stop spaced from said cam and in fixed relationship thereto, said stop being in blocking relationship to said pin when said shaft is in its axially outward position and in nonblocking relationship to said pin when said shaft is in its axially inward position, a timer knob hub attached at one end of said shaft for rotation therewith and having a flange portion and a male threaded portion, said male threaded portion including a raised thread having a blunt end, a timer dial having an indicating portion and a female threaded portion threadedly engaged with said male threaded portion on said timer knob hub, and a spring between said female threaded portion and said flange portion to yieldingly resist relative rotatable movement between said hub and said timer dial, said indicating portion having a start position and an off position, said female threaded portion including a recessed thread complementary to said raised thread and having a blunt end thereon abuttable with said blunt end on said raised thread, said blunt end on said recessed thread movable out of abutting enagement with said blunt end on said raised thread against the resistance of said spring when said timer dial is rotated reversely with said timer shaft in either its axially inward position or its axially outward position, whereby reverse rotation of said timer dial causes said timer dial to threadedly disengage said timer knob hub to prevent reverse rotation of said timer shaft, said blunt end on said recessed thread movable back into abutting engagement with said blunt end on said raised thread against the resistance of said spring when said timer dial is rotated forwardly with said timer shaft in its axially outward position and with said pin blocked by said stop to move said off position on said indicating portion back into predetermined proper relationship with said pin, whereby forward rotation of said timer dial re-establishes proper orientation of said timer dial with respect to said timer shaft and disengages said pin from said cam and aligns said pin with the space between said cam and said stop to thereby facilitate the movement of said timer shaft axially inwardly and the movement of said pin through said space for connecting said timer for the supply of power thereto.

2. In combination, a timer having a fixed cam and a rotationally nonreversible, axially movable shaft power rotatable forwardly for controlling a timed cycle and adapted by the axially inward movement thereof to connect said timer for the supply of power thereto for initiating the rotation of said shaft and adapted by the axially outward movement thereof to disconnect said timer from the supply of power thereto for terminating the rotation of said shaft, pin means on said shaft engageable by said cam once in every 360° rotation thereof to move said shaft axially outwardly, stop means spaced from said cam and in fixed relationship thereto, said stop means being in blocking relationship to said pin means when said shaft is in its axially outward position and in non-blocking relationship to said pin means when said shaft is in its axially inward position, a timer knob hub attached at one end of said shaft for rotation therewith and having a flange portion, a timer dial having an outer indicating portion and a central collar portion, interconnecting means between said timer knob hub and said central collar portion, said interconnecting means comprising a first blunt end portion on said central collar portion and a second blunt end portion on said timer knob hub selectively abuttable to lock said timer knob hub for rotation with said timer dial in the forward direction, and a spring between said timer dial and said flange portion to yieldingly resist relative rotatable movement between said hub and said timer dial, said indicating portion having a start position and an off position, said first blunt end portion on said central collar portion abutting said second blunt end portion on said timer knob hub, said first blunt end portion movable out of abutting engagement with said second blunt end portion against the resistance of said spring when said timer dial is rotated reversely with said timer shaft in either its axially inward position or its axially outward position, whereby reverse rotation of said timer dial causes said timer dial to rotate relative to said timer knob hub to prevent reverse rotation of said timer shaft, said first blunt end on said central collar portion movable back into abutting engagement with said second blunt end on said timer knob hub against the resistance of said spring when said timer dial is rotated forwardly with said timer shaft in its axially outward position and with said pin means blocked by said stop means to move said off position on said indicating portion back into predetermined proper relationship with said pin means whereby forward rotation of said timer dial re-establishes proper orientation of said timer dial with respect to said timer shaft and disengages said pin means from said cam and aligns said pin means with the space between said cam and said stop means to thereby facilitate the movement of said timer shaft axially inwardly and the movement of said pin means through said space for connecting said timer for the supply of power thereto.

References Cited by the Examiner
UNITED STATES PATENTS

| 670,585 | 3/01 | Fowler | 248—356 X |
|---|---|---|---|
| 1,172,969 | 2/16 | Fobes | 74—547 X |
| 1,353,145 | 9/20 | Clement | 74—55 XR |
| 2,520,695 | 8/50 | Sisson | 68—12 |
| 2,646,673 | 7/53 | McCarty | 68—12 |
| 2,682,859 | 7/54 | Jensen et al. | 74—89 X |
| 2,797,591 | 7/57 | Marrapese | 74—528 |
| 2,825,772 | 3/58 | Jones | 200—37 |
| 2,971,143 | 2/61 | Stilwell | 68—12 X |
| 3,014,380 | 12/61 | Martens | 74—459 |
| 3,019,667 | 2/62 | Bann | 74—528 |
| 3,053,946 | 9/62 | Greenwald | 200—35 |

FOREIGN PATENTS
1,251,386  12/60  France.

BROUGHTON G. DURHAM, *Primary Examiner.*